US009790864B2

(12) United States Patent
Skertic et al.

(10) Patent No.: US 9,790,864 B2
(45) Date of Patent: Oct. 17, 2017

(54) PROGNOSTIC HEALTH MANAGEMENT APPROACHES FOR PROPULSION CONTROL SYSTEM

(71) Applicant: Rolls-Royce North American Technologies, Inc., Indianapolis, IN (US)

(72) Inventors: Richard J. Skertic, Carmel, IN (US); Joseph D. Myer, Avon, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 74 days.

(21) Appl. No.: 14/204,547

(22) Filed: Mar. 11, 2014

(65) Prior Publication Data
US 2014/0277991 A1  Sep. 18, 2014

Related U.S. Application Data

(60) Provisional application No. 61/800,460, filed on Mar. 15, 2013.

(51) Int. Cl.
*F02C 9/00* (2006.01)
*G05B 23/02* (2006.01)

(52) U.S. Cl.
CPC ............ *F02C 9/00* (2013.01); *G05B 23/0289* (2013.01)

(58) Field of Classification Search
CPC .......................... F02C 9/00; G05B 23/0289
See application file for complete search history.

(56) References Cited

U.S. PATENT DOCUMENTS

| 4,249,238 | A | 2/1981 | Spang, III et al. |
| 6,459,963 | B1 | 10/2002 | Bennett et al. |
| 6,986,486 | B2 | 1/2006 | Darbyshire |
| 7,031,812 | B1 | 4/2006 | Pettigrew et al. |
| 7,285,871 | B2 | 10/2007 | Derouineau |
| 7,286,923 | B2 | 10/2007 | Pomeroy et al. |
| 7,308,322 | B1 * | 12/2007 | Discenzo ........... G05B 23/0221 700/175 |
| 7,366,590 | B2 | 4/2008 | Balasu |
| 7,822,493 | B2 | 10/2010 | Mossman et al. |

(Continued)

FOREIGN PATENT DOCUMENTS

EP    1420153 A2    5/2004

OTHER PUBLICATIONS

International search report PCT/US2014/023394 mailed on Nov. 3, 2014.

*Primary Examiner* — Truc M Do
*Assistant Examiner* — Jess Whittington
(74) *Attorney, Agent, or Firm* — Fishman Stewart PLLC

(57) ABSTRACT

A real-time gas turbine management system includes a controller system coupled to a gas turbine engine. The controller system is configured to control demand on a first and second component of a gas turbine engine. The controller system is configured to identify a set point reference of the first component, identify a set point reference of the second component, and identify a data set indicative of a level of deterioration of the gas turbine engine. The controller system is also configured to change the set point reference of the first component to extend a lifespan of the gas turbine engine and/or change the set point reference of the second component to extend the lifespan of the gas turbine engine.

15 Claims, 5 Drawing Sheets

(56) References Cited

U.S. PATENT DOCUMENTS

| | | |
|---|---|---|
| 7,860,635 B2 | 12/2010 | Litt |
| 8,082,047 B1 | 12/2011 | Sharma |
| 8,185,260 B2 | 5/2012 | Delaloye et al. |
| 8,185,292 B2 | 5/2012 | Litt |
| 8,490,404 B1* | 7/2013 | Adibhatla ............... F02C 9/00 60/772 |
| 8,914,149 B2* | 12/2014 | Safa-Bakhsh .......... G07C 5/006 700/245 |
| 8,914,300 B2* | 12/2014 | Sustaeta ............... G05B 13/024 700/99 |
| 2004/0123600 A1* | 7/2004 | Brunell .................. F02C 9/00 60/773 |
| 2006/0235707 A1* | 10/2006 | Goldstein .......... G05B 23/0283 702/182 |
| 2010/0114808 A1* | 5/2010 | Mintah ................. G06Q 10/04 706/46 |
| 2010/0161154 A1 | 6/2010 | Moeckly et al. |
| 2010/0161247 A1* | 6/2010 | Moeckly ................. F02C 7/00 702/41 |
| 2010/0275575 A1* | 11/2010 | Brown .................... F02C 9/00 60/204 |
| 2011/0137575 A1* | 6/2011 | Koul ................. G05B 23/0245 702/34 |
| 2012/0029892 A1 | 2/2012 | Thulke |
| 2012/0283963 A1* | 11/2012 | Mitchell ................ F01D 17/02 702/34 |
| 2013/0035875 A1* | 2/2013 | Hall ..................... B02C 18/00 702/34 |
| 2014/0123625 A1* | 5/2014 | Snell .................... F02K 1/18 60/204 |

\* cited by examiner

PROGNOSTIC HEALTH MANAGEMENT APPROACHES FOR PROPULSION CONTROL SYSTEM

CROSS-REFERENCE TO RELATED APPLICATIONS

This application claims priority to U.S. Provisional Patent Application No. 61/800,460, filed Mar. 15, 2013, the contents of which are hereby incorporated in their entirety.

FIELD OF TECHNOLOGY

An improved health management approach for extending the life of a system and/or components thereof is disclosed.

The improvements are applicable to engine systems used to power marine, land, air, and underwater applications, as examples.

BACKGROUND

It is often desirable to integrate prognostic tools into health management systems of a gas turbine system. For example, prognostic tools can be utilized to assess probability of failure of a system or one or more components thereof. Accordingly, one or more components of the system can be taken out of service before the probability of failure for such component(s) rises to unacceptable levels. However, this approach may result in discarding components that still have remaining life early. Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary gas turbine engine and schematic of an electrical system coupled thereto are described herein and are shown in the attached drawings. The electrical system includes at least two generator circuits, one coupled to a high pressure portion of a gas turbine engine and the other coupled to a low pressure portion of the gas turbine engine.

Figure 1:
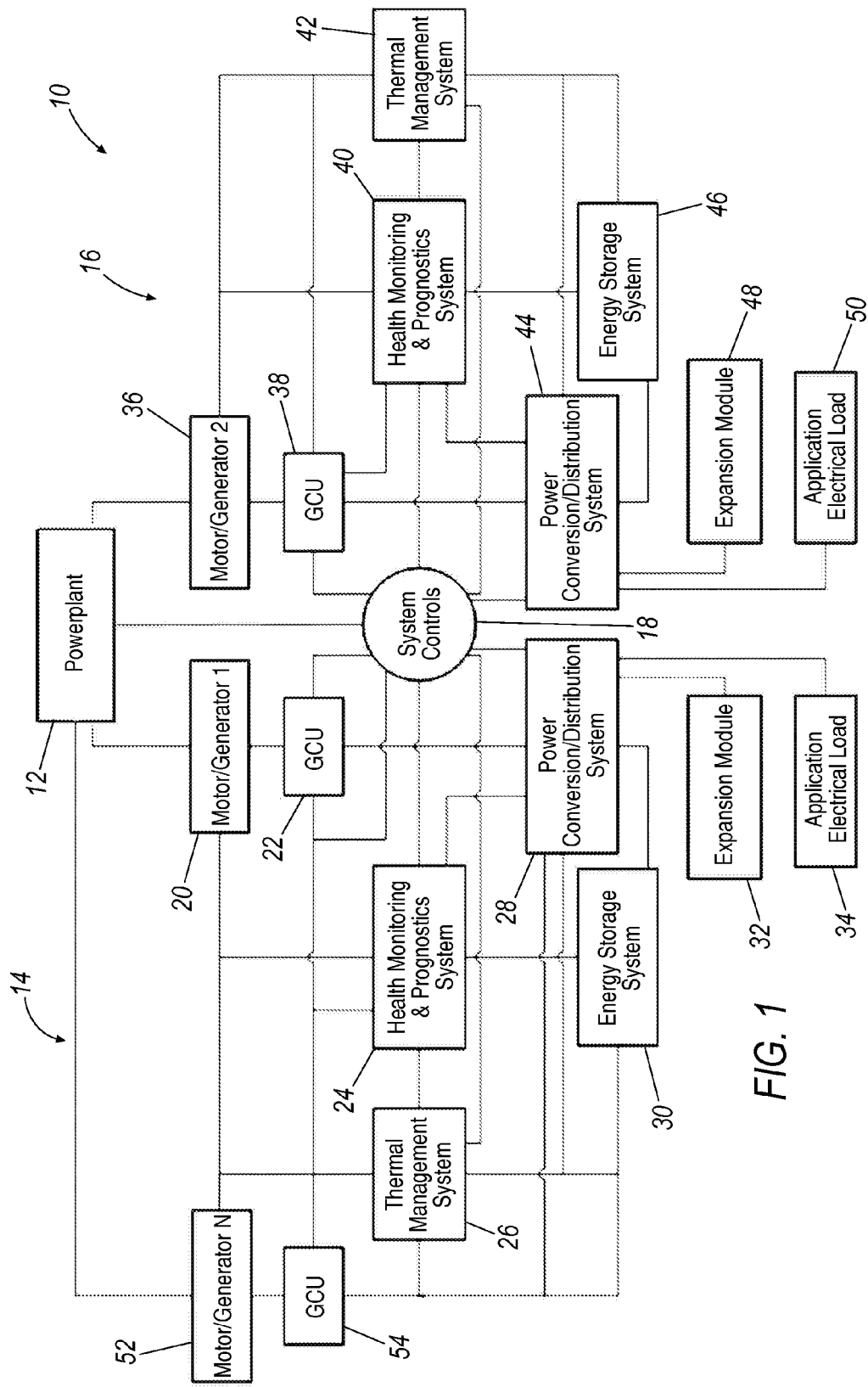
FIG. 1 is a schematic illustration of an electrical system coupled to a gas turbine engine, according to one example.

FIG. 1 illustrates an electrical system 10 in which a power plant or engine 12, such as a gas turbine engine, provides electrical power to a first power circuit 14 and a second power circuit 16. A system controller 18 is coupled to engine 12 and also to first and second circuits 14, 16. First power circuit 14 includes a motor/generator 20 and a General Control Unit (GCU) 22 coupled thereto. GCU 22 is also coupled to other components within first power circuit 14, such as a health monitoring and prognostics system 24, a thermal management system 26, and a power conversion/distribution system 28. First power circuit 14 also includes an energy storage system 30, an expansion module 32, and application electrical load(s) 34. System controller 18 is configured to regulate power flow (such as electrical currents and voltages within system 10) to provide power to various electrical busses. The power may be DC, AC, or conversion therebetween. System controller 18 may also be configured to execute computer program instructions to control the operation of engine 12, including fuel flow, or the position of any variable geometry systems (e.g., from the flight control system of an aircraft or from a steering system of a ship).

Health monitoring and prognostics system 24 monitors the health of system components, and is used to estimate component life based on sensor feedback received from components within engine 12. Further details regarding health monitoring and prognostic system 24 will be set forth below with respect to FIGS. 3-5. Referring back to FIG. 1, thermal management system 26 includes pumps, expansion valves, and the like, as well as a controller, to provide coolant for the purposes of climate control, and other system operations. Power conversion/distribution system 28 receives electrical power from motor/generator 20 via GCU 22, and converts the power to a more useable form such as a DC voltage for storage in energy storage system 30, expansion module 32, and application electrical load(s) 34. The energy storage system 30 may include a battery or other energy storage system. Energy storage system 30 stores energy for providing power when engine 12 is not running (i.e., not generating power), but also to provide power to motor/generator 20 to provide starting power to engine 12 during startup. Expansion module 32 and application electrical load 34 represent additional electrical components that receive power from power conversion/distribution system 28.

Second power circuit 16 similarly includes a motor/generator 36 and a GCU 38 coupled thereto. GCU 38 is also coupled to other components within second power circuit 16, such as a health monitoring and prognostics system 40, a thermal management system 42, and a power conversion/distribution system 44. Second power circuit 16 also includes an energy storage system 46, an expansion module 48, and application electrical load(s) 50. The components 36-50 of second power circuit 16 are similarly arranged as described with respect to first power circuit 14. Additionally, in one example electrical system 10 includes one or more additional motor/generators 52 and corresponding GCUs 54 as well, which may be coupled to a gas turbine engine as will be further described. Thus, the system 10 is modular and flexible in that it may be expanded to include a number N of motor/generators based on contemplated operating conditions.

Figure 2:
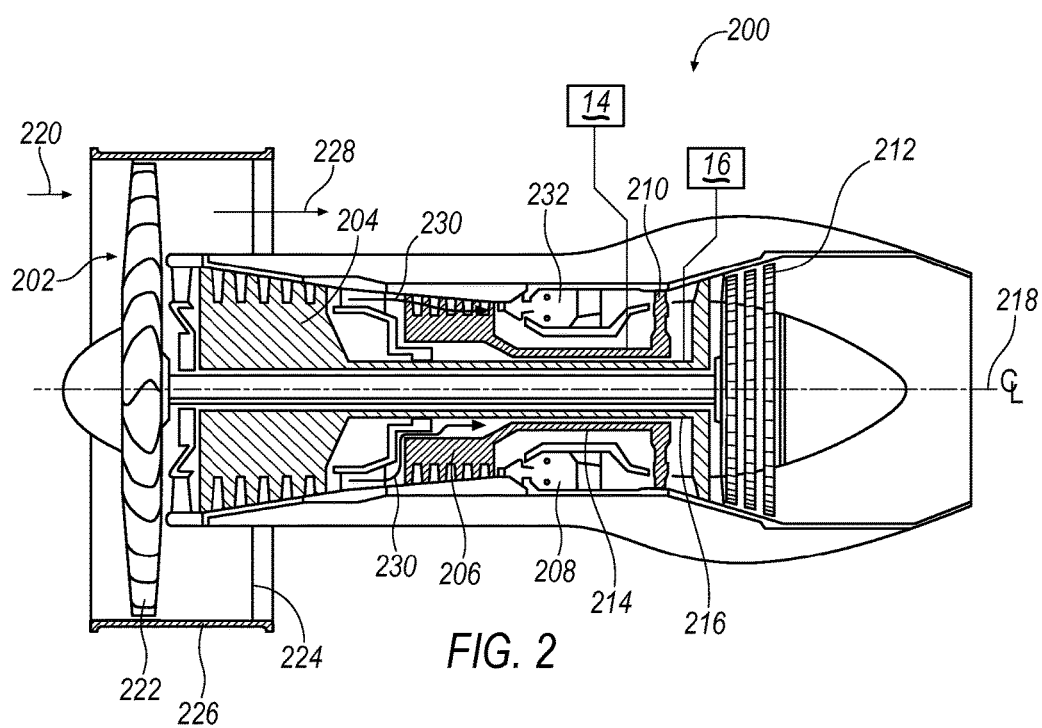
FIG. 2 illustrates an exemplary gas turbine engine that incorporates the electrical system illustrated in FIG. 1.

FIG. 2 illustrates a gas turbine engine 200, which includes a fan 202, a low pressure compressor and a high pressure compressor, 204 and 206, a combustor 208, and a high pressure turbine and low pressure turbine, 210 and 212, respectively. The high pressure compressor 206 is connected to a first rotor shaft 214 while the low pressure compressor 204 is connected to a second rotor shaft 216. The shafts extend axially and are parallel to a longitudinal center line axis 218. Ambient air 220 enters the fan 202 and is directed across a fan rotor 222 in an annular duct 224, which in part is circumscribed by fan case 226. Bypass airflow 228 provides engine thrust while a primary gas stream 230 is directed to a combustor 232 and the high pressure turbine 210.

First and second rotor shafts 214, 216, are coupled, respectively, to first and second power circuits 14, 16, as illustrated in FIG. 1. Thus, first and second power circuits 14, 16 are configured to split power between motor/generators 20, 36 so that each provides a portion of the power demand. As such, a power sharing/transfer arrangement between motor/generators 20, 36 provides the platform power demand, and includes a capability to provide power to one of the shafts 214, 216, as necessary. Such arrangement also provides an ability to optimize load shedding and a demand side management of the power requirement. Thus, life and performance considerations may be taken into account in real-time and optimized to actively seek and obtain performance optima while equipment is in operation.

Figure 3:
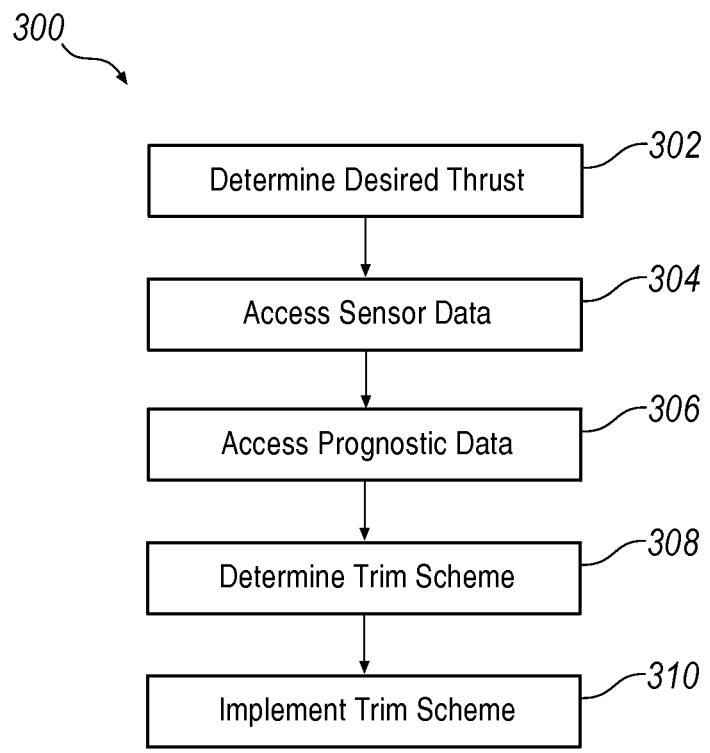
FIG. 3 is a flowchart depicting a technique for extending the life of a system according to an embodiment.

Turning now to FIG. 3, a flowchart depicting a technique 300 for extending the life of a gas turbine system according to an embodiment of the disclosure is shown. Technique 300 begins at block 302 where desired thrust on a gas turbine system is determined. In one embodiment, desired thrust is determined by a user input. Yet, in another embodiment, desired thrust may be determined automatically by a controller or the like. After the desired thrust is determined 302, process control proceeds to block 304, where sensor data such as fan speed, engine pressure ratio (EPR), and/or turbo fan power ratio (TPR) is accessed. It is contemplated that alternative or additional sensor data may be accessed.

After sensor data is accessed 304, prognostic data is accessed at block 306. Prognostic data may take a variety of forms. For example, prognostic data may include information indicative of the remaining life limit and/or level of degradation of the gas turbine system and/or one or more components thereof, such as a rotor or fuel pump of the gas turbine system. It is noted that the order in which sensor data and prognostic data are accessed as shown in blocks 304-306 need not be the same as that shown in FIG. 3. Rather, prognostic data may be accessed at the same time as, or prior to, accessing sensor data.

Referring back to the present embodiment shown in FIG. 3, after accessing prognostic data 306, process control proceeds to block 308, where a trim scheme based on the desired thrust, sensor data, and prognostic information is determined for one or more components of the gas turbine system. For example, it may be determined that, in light of the remaining life limit or level of degradation of the gas turbine system and sensor data, that the rotor speed of the fan rotor (see e.g., fan rotor 22. FIG. 2) should be increased so as to accommodate the desired thrust. As such, a trim scheme may determine that the set point reference for the fan rotor speed will be increased so that the gas turbine system can produce the desired thrust. Alternatively, it may be determined that due to the remaining life limit or level of degradation of the fan rotor and its present rotor speed, that the rotor speed (i.e., fan speed) cannot or should not be increased to accommodate the desired thrust. As such, it may be determined that a different control mode shall be manipulated so that the desired thrust can be achieved. For example, it may be determined that the set reference point corresponding to the engine pressure ration (EPR) or turbo fan power ratio (TPR) shall be manipulated to achieve the desired thrust. Since the EPR or TPR is then manipulated so that the desired thrust can be reached, this control mode change allows the set point reference for the fan speed to remain the same or be decreased. As such, the system can meet the desired thrust in such a manner that decreases the rate at which the rotor degrades or at least does not increase the rate at which the rotor degrades. In other words, by decreasing the demand on the rotor or at least by not increasing the demand, the life of the rotor, as well as the gas turbine system, can be extended. It is contemplated that more than one control mode change may be manipulated to achieve desired thrust. For example, it may be determined that the set point reference of both EPR and TPR be manipulated to achieve desired thrust. Further details regarding the determination of the trim scheme will be set forth in FIG. 4.

Still referring to FIG. 3, after the trim scheme is determined, process control proceeds to block 310, where the trim scheme is implemented, thus manipulating the set point reference of one or more components of the gas turbine system so as to extend the life of the system and/or one or more components.

Figure 4:
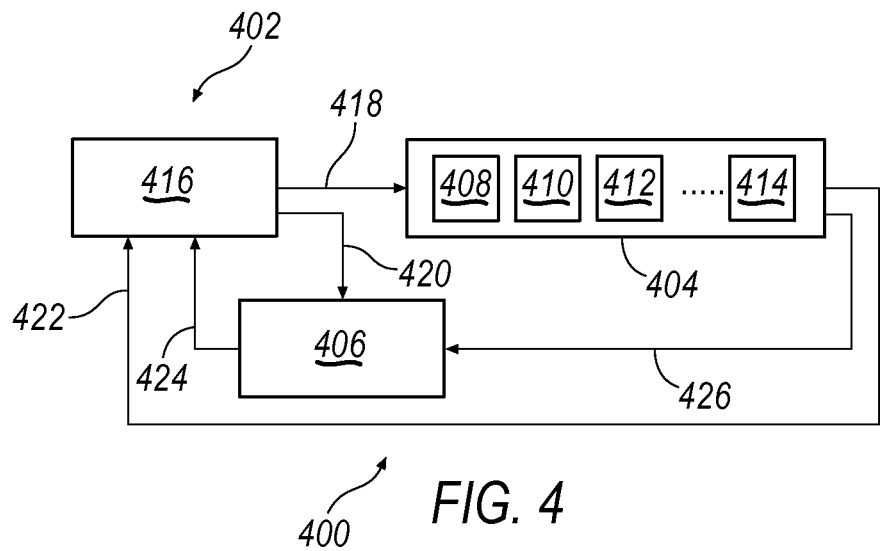
FIG. 4 is a block diagram of a control system configured to extend the life of a system according to an embodiment.

With reference now to FIG. 4, a block diagram of an environment 400 having a management system 402 for controlling operating conditions is shown according to an embodiment. In the present embodiment, the environment 400 includes the management system 402, a turbine system 404, and a prognostic unit 406. Further, according to the present embodiment, turbine system 404 includes a plurality of components 408-414 configured to effect thrust of turbine system 404 and controllable by management system 402. Though in the present embodiment, system 404 is considered a turbine system and components 408-414 are components that effect thrust on turbine system 404, turbine system 404 could be another system such as an oil extraction rig or a gas extraction rig and accordingly components 408-414 would be components relative to such systems. Further, it is contemplated that turbine system 404 or other systems could have more components than the four components 408-414 shown that are controllable by a management system such as management system 402. Indeed, systems or plants having less than four components controllable by a management system such as management system 402 are also contemplated.

Referring to the embodiment depicted in FIG. 4, management control system 402 is comprised of a single management controller 416. However, though not shown, it is contemplated that management system 402 may be comprised of more than one controller. Further, it is contemplated that prognostic unit 406 may be an integral part of management system 402 rather than a distinct unit as shown (see e.g., health monitoring and prognostics system 24, FIG. 1).

With continued reference to FIG. 4, according to an embodiment, management controller 416 sends command data 418 to turbine system 404. This command data 418 causes the plurality of components 408-414 to each act in a particular manner. Management controller 416 typically employs a control mode to modify command data 418. If the set point reference (i.e., a type of command data 418) for component 408 is modified, management controller 416 is referred to as employing a component 408 control mode. For example, if component 408 were a fan rotor assembly and the command data 418 relating to fan speed for the assembly 408 were modified, such control is generally considered a rotor speed control mode. If the set point reference for another component (e.g., component 410, 412, or 414) were then modified, such control change is generally considered to be a control mode change. Further details regarding control modes and the manipulation of set point references will be set for below with respect to FIG. 5.

Referring still to FIG. 4, in addition to passing command data 418, 420 to turbine system 404 and prognostic unit 406, respectively, management controller 416 also receives sensor data 422 from turbine system 404 and prognostic data 424 from prognostic unit 406. Sensor data 422 includes information indicative of a state unique to each of components 408-414. Prognostic data 424, on the other hand, comprises information indicative of the level of deterioration of the system 404. It is contemplated that prognostic data 424 also includes information indicative of the level of deterioration of the subsystems (e.g., components 408-414).

Prognostic unit 406 determines the remaining life approximations and or system degradation by comparing sensor data 426 from turbine system 404 with control demand data 420 from management controller 416. According to an embodiment, sensor data 426 received by prognostic unit 406 is substantially similar to sensor data 422 received by management controller 416.

Prognostic unit 406 may, for example, use an algorithm or real-time model (not shown) to compare the command data 420 (i.e., data that would have the effect of making components 408-414 each act in a particular manner such as command data 418) with sensor data 426 (i.e., data indicative of how components 408-414 responded to command data 418) to determine remaining life approximations or level of degradation of each component 408-414 of turbine system 404.

Management controller 416 employs the prognostic data 424 and sensor data 422 to determine whether or not command data 418 associated with one or more components 410-414 need be altered to extend the life of turbine system 404, or components 408-414 thereof. For example, the altered command data may be associated with fan or rotor speed control (e.g., a rotor assembly), EPR control, TPR control, or FPMU control.

Figure 5:
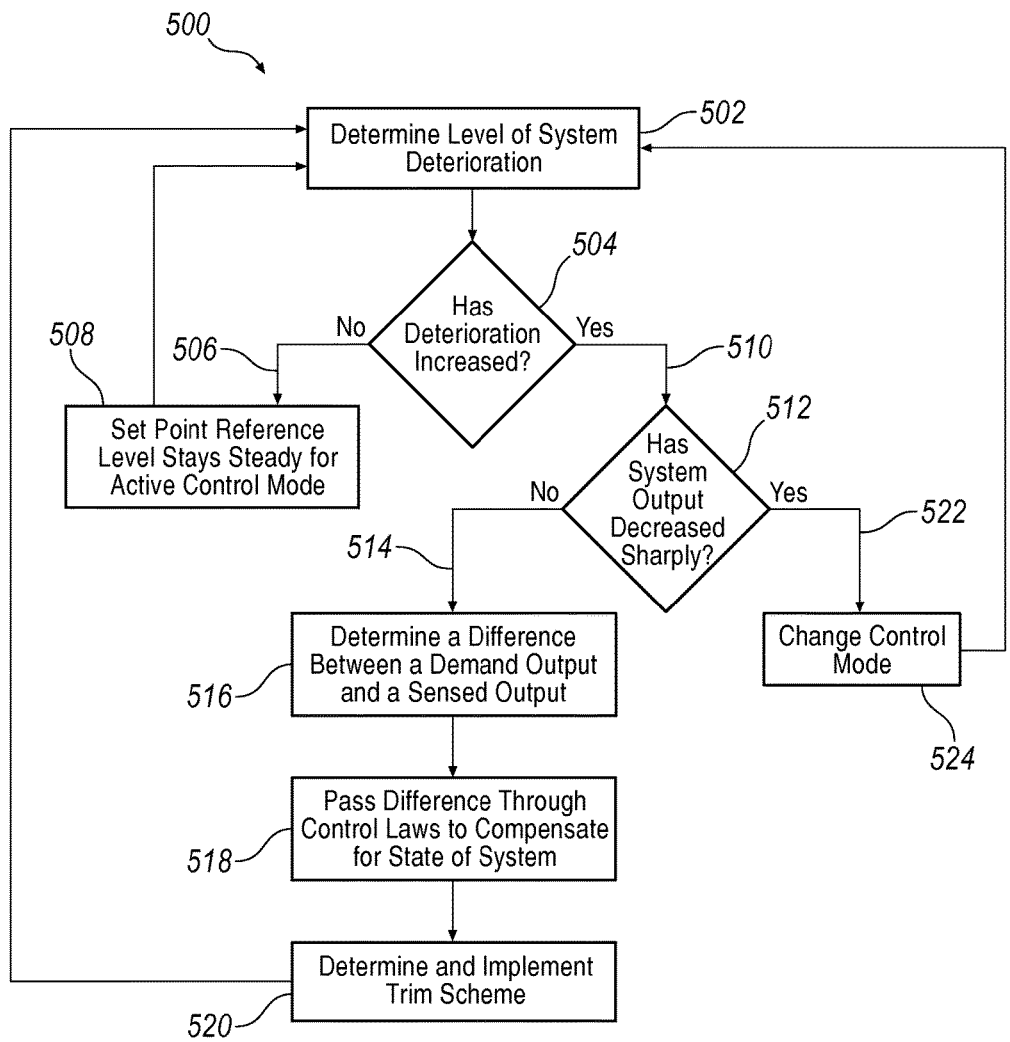
FIG. 5 is a flowchart depicting a technique for extending the life of a system according to another embodiment.

Turning now to FIG. 5, a flowchart depicting a technique 500 for determining a trim scheme based on prognostic data is shown according to an embodiment.

Technique 500 begins at block 502 where a level of system deterioration is determined from prognostic data. Process control then proceeds to decision block 504 where it is determined whether or not the level of deterioration has increased since a control mode set point reference was last set. For example, if the system is a gas turbine engine, the system may rely on a fan rotor speed control mode to meet demanded thrust. In such an example, at decision block 504, a determination would be made as to whether or not the level of system deterioration has increased since the fan rotor speed set point reference was last set.

Proceeding with technique 500, if it is determined 506 that the level of system deterioration has not increased process control proceeds to block 508, where the present set point reference for the active control mode is maintained. Process control then proceeds back to block 502 where technique 500 once again begins.

On the other hand if it is determined 510 that the level of system deterioration has increased, process control proceeds to decision block 512 where it is determined whether not system output has decreased sharply. Whether or not a decrease in output is considered a sharp decrease or not will be dependent on preset parameters of the system.

If it is determined 514 that output has not decreased sharply (e.g., no sharp decrease in thrust from a turbine engine), process control proceeds to block 516 where a difference in control mode demand input and control mode sensed output is determined. For example, if the system were a turbine engine a demanded thrust would translate to a demanded input for a particular control mode. If that particular control mode were fan rotor speed, then a difference between a fan rotor speed input and the sensed fan rotor speed would be determined 516. After the difference determination 516 is made process control proceeds to block 518, where the difference is passed through control laws to compensate for the state of the system.

For example, if the system were a plane having a turbine engine, the manner in which the turbine reacts to commands differs depending on where in the flight envelope (e.g., idle, flight, or high altitude) the plane resides, as would be understood by one skilled in the art. Other systems, besides flight systems, may also have compensation needs. As such, according to an embodiment, control laws derived from a compensation table are utilized by a controller (e.g., a proportional integral (PI) controller, proportional integral derivative (PID) controller, or similar controller) to change the difference determined at block 516 into a constant that is past to block 520 where a trim or scalar scheme is determined therefrom and implemented. Such a trim scheme may, for example, increase the set point reference associated with fan rotor speed so as to compensate for the deterioration of a turbine system. Alternatively, if the active control mode was associated with EPR, then the trim scheme would produce a reduced set point reference to compensate for system deterioration. That is, as a turbine system deteriorates, EPR generally causes more thrust to be produced than needed. Accordingly, a decrease in the EPR set point reference would allow the turbine system to produce the thrust needed.

Regardless of the control mode employed, manipulating a set point reference allows the system to output as intended. Therefore the system does not need to be taken off task or off-station. In other words the life of the system has been extended.

To continue with technique 500, if it were determined 522 that system output has decreased sharply, then process control proceeds to block 524 where the control mode is changed (i.e., a different control mode is implemented). The control mode change could, for example, be achieved through user notification or implemented automatically. If, according to an embodiment, the system were utilizing a fan rotor speed control mode, the system may change to an EPR control mode, TPR control mode, or an FPMU control mode. It is noted that according to an alternate embodiment not shown, the ability to implement a control mode change is not employed. That is, if it is determined 510 that the system level of deterioration has increased, process control would proceed to block 514 where a difference between demand input and sensed output is determined.

Referring back to an embodiment depicted in FIG. 5, whether or not the control mode is changed 524, a trim scheme is determined 520 that does change a set point reference, or the control mode is not changed and the set point reference remains unchanged 508, process control proceeds to block 502 where technique 500 is repeated.

Figure 6:
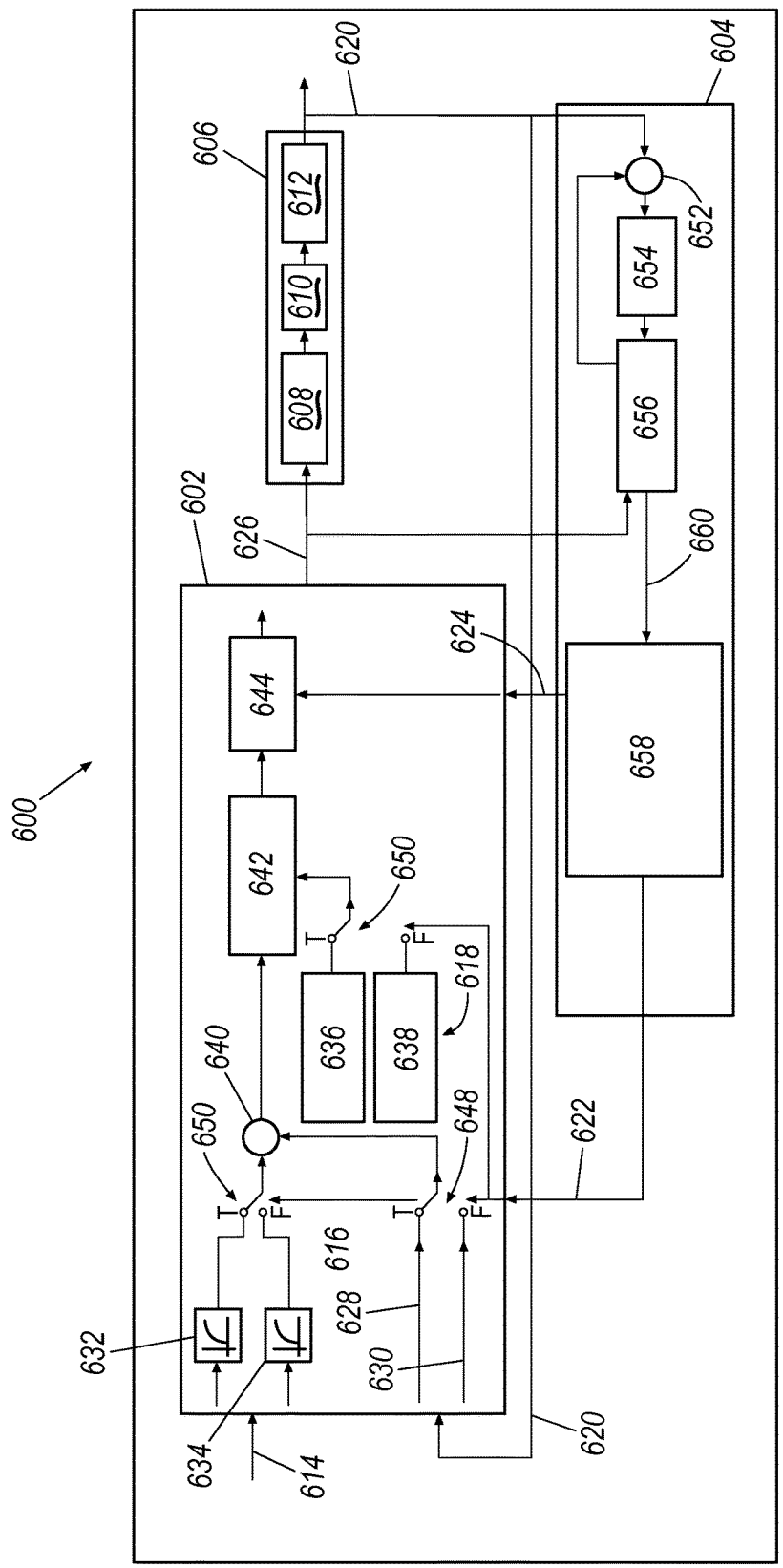
FIG. 6 is a block diagram depicting a control scheme for extending the life of a system according to an embodiment.

Turning now to FIG. 6, a block diagram depicting a control scheme 600 implementing aspects of technique 300 of FIG. 3 and technique 500 of FIG. 5 are shown according to an embodiment. The control scheme 600 determines in real-time a set point reference for an active control mode to extend the life of a system or plant.

Control scheme 600 of FIG. 6 depicts a set of management logic 602 and a set of prognostic logic 604 and the interaction of each 602, 604 with a system 606. System 606 includes a plurality of actuators 608, a plant 610, and a plurality of sensors 612. It will be appreciated that, though not shown, actuators 608 and sensors 612 could be an integral part of the plant 610. That is, rather than the plant 610 being distinct from plurality of actuators 608 and sensors 612 as depicted in FIG. 6, the actuators 608 and sensors 612 may be an integral part (not shown) of the plant 610.

Referring to the embodiment depicted in FIG. 6, the management logic 602 and prognostic logic 604 are employed to extend the life of the system 606. According to an embodiment, management logic 602 is of the model-based prognostic health management control mode type and the prognostic logic 604 is of the integrated model based prognostics type.

Management logic 602 utilizes data representative of a demanded thrust 614, a plurality of reference schedules 616, a plurality of compensation tables 618, sensor data 620, and prognostic data 622, 624 to determine control demands 626 in real-time for the system 606 to extend the life thereof. Sensed data 620 of the present embodiment includes sensed EPR data 628 and sensed speed data 630 (i.e., fan rotor speed data) received from the system 606 via the sensors 612. As such, the plurality of reference schedules 616 of the present embodiment includes an EPR reference schedule 632 and a rotor speed reference schedule 634. As will be appreciated by those skilled in the art, reference schedule data includes information that associates a state of a component (e.g., a component of the plant 610) with a given thrust. For example, the rotor speed reference schedule 634 determines rotor speeds at a variety of given thrusts. In a similar manner, the EPR reference schedule 632 determines that EPR values should be at X when the thrust is at Y. It is noted that these schedules 632, 634 correspond to healthy components.

Corresponding with the sensed EPR and speed data 628, 630, respectively, and the EPR and speed reference schedules 632, 634, respectively, the plurality of compensation tables 618 includes an EPR compensation table 636 and a rotor speed reference table 638.

It will be appreciated that according to other embodiments, the sensed data 620 may include additional sensor data other than the EPR sensor data 628 and speed sensor data 630 shown in the embodiment depicted in FIG. 6. For example, according to an alternate embodiment not shown, sensed TPR data may be employed along with sensed EPR data and sensed speed data. Though not shown, according to such an embodiment, corresponding TPR, EPR, and speed references schedules and TPR, EPR, and speed compensation tables would also be employed.

It will be appreciated that embodiments may employ only one type of sensor data or more than two types of sensor data. Accordingly, such embodiments will employ corresponding reference schedules and compensation tables.

With reference to the embodiment depicted in FIG. 6, to manipulate the data 614, 620, 622, 624 to determine the control demands 626, the management logic 602 employs a set of summation logic 640, a set of PI compensation logic 642 (i.e., control law logic), and a set of trim scheme logic 644.

Management logic 602 receives the prognostic data 622 about a component (not shown) of the plant 610, where the prognostic data 622 includes remaining life limit information about the component. According to the present embodiment, it is determined by the prognostic logic 604 that the remaining life limit of a component associated with EPR has decreased. As such, the EPR set point reference will be modified to extend the life of the system 606 and/or plant 610.

Accordingly, the sensed EPR data 628 and the EPR reference schedule data 632 is passed to the summation logic 640 to determine a difference value between the sensed EPR data 628 and a schedule value associated with the given thrust 614, where the schedule value is determined from EPR reference schedule 632. Any variation in units between the sensed EPR data 628 and the EPR reference schedule 632 values is also taken into account by the summation logic 640.

The difference value is then passed by the summation logic 640 to the PI compensation logic 642. It is noted that the PI compensation logic 642 (i.e., control laws) may take other forms. For example, rather than PI compensation logic, proportional integral derivative logic may be employed.

With continued reference to the present embodiment, in addition to the difference value passed from the summation logic 640, the PI compensation logic 642 also receives the corresponding EPR compensation table 636. The EPR compensation table 636 includes EPR compensation information associated with different states of the plant 610. For example, if the plant 610 were a turbine flight engine, the EPR compensation table 636 would include EPR compensation information associated with different flight envelopes of the turbine flight engine (e.g., idle, standard flight, and high altitude flight). The PI compensation logic 642 employs state-specific compensation information from the EPR compensation table 636 to modify the difference value received from the summation logic 640. The modified difference value is then passed to the trim scheme logic 644.

In addition to the modified difference value, the trim scheme logic 644 also receives the prognostic data 624 from the prognostic logic 604. Prognostic data 624 is generally the same data as prognostic data 622, which is used to determine what reference schedule and compensation table will be employed. In a similar manner, the trim scheme logic 644 uses prognostic data 624 to determine what type of trim scheme will be determined. According to the example represented in the present embodiment, the remaining life limit of an EPR component has decreased. Accordingly, the trim scheme logic 644 determines from prognostic data 624 that a trim scheme for an EPR component (not shown) of the plant 610 will be determined.

As such, the trim scheme logic 644 manipulates the modified difference value from the PI compensation logic 642 to determine a trim scheme that determines a new EPR set point reference that will be passed with control demands 626 to the system 606 to extend the life thereof.

As discussed above, the management logic 602 receives prognostic data 622, 624 from the prognostic logic 604. In the example depicted in the embodiment set forth in FIG. 6, prognostic data 622, 624 set forth that the remaining life limit of an EPR component (not shown) of the plant 610 has decreased. Accordingly, a plurality of switches 646, 648, 650 were set so that the EPR reference schedule 632 and the sensed EPR data 628 were passed on to the summation logic 640 and the EPR compensation table 636 was passed to the PI compensation logic 642. However, if prognostic data instead included information that the remaining life limit of a fan rotor had decreased, then the switches 646, 648, 650 would instead be set to pass the rotor speed reference schedule 634, the sensed rotor speed data 630, and the EPR compensation table 638, respectively. If an embodiment included more sensed data than the sensed EPR data 628 and the sensed rotor speed data 630, additional switches (not shown) would be employed. Regardless of the embodiment, a trim scheme is determined in real-time to modify a set point reference to extend the life of a system and/or plant (e.g., system 606 and/or plant 610). Accordingly, the system 606 and/or plant 610 does not need to be taken off-station for modifications.

With reference to prognostic information such as prognostic data 622, 624, it is noted that a variety of prognostic logic can be employed to determine such prognostic data 622, 624. In the embodiment depicted in FIG. 6, the prognostic logic 604 includes a set of prognostic summation logic 652, a tracking filter 654, a real-time engine model 656, and a set of gradient search optimization prognostics and engine management algorithms 658.

Control demands 626 are input into the real-time engine model 656 while the sensor data 620 associated with the control demands 626 is input into the prognostic summation 652. One skilled in the art would appreciate that with the control demand and sensor data 626, 620, respectively, matched outputs 660 are determined. Matched outputs 660 are then input into optimization prognostics and engine management algorithms 658, where the remaining life limit data 622, 624 is determined. As discussed in detail above, the remaining life limit data 622, 624 is employed by the management logic 602 to determine a trim scheme in real-time to extend the life of the system 606 and/or plant 610.

When a system begins to operate at a decreased output, often the system is often taken out of service or the system is operated at a decreased performance that can cause further damage to the system. Embodiments depicted and discussed with respect to FIGS. 3-6 help to maintain and increase system lifespan. By using prognostic information in real-time during operation of the system, the useful life of a system can be extended.

Computing devices such as system 10 of FIG. 1 generally include computer-executable instructions such as the instructions of the system controller 18, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A real-time system, comprising: a controller system having a system controller with a processor, the controller system being coupled to an engine and configured to control demand on a first and second component of the engine, the controller system is configured to: operate the engine in a control mode associated with one of the first component and the second component; identify, by way of the system controller, a set point reference of the first component; identify, by way of the system controller, a set point reference of the second component; identify, by way of the system controller, a data set indicative of a level of deterioration of the engine by at least referencing at least one reference schedule that associates a state of at least one of the first component and the second component with a given thrust; based on the level of deterioration determine and implement a trim scheme, which includes increasing the set point reference of the first component if the control mode is a rotor speed control mode, and decreasing the set point reference of the second component if the control mode is one of an engine pressure ratio control mode and a turbine fan power ratio control mode; wherein the set point reference of the first component is a fan speed set point reference and the set point reference of the second component is one of an engine pressure ratio set point reference and a turbo fan power ratio set point reference.

2. The real-time system as claimed in claim 1, further comprising a prognostic data unit having a processor and a memory and being configured to determine the level of deterioration of the engine.

3. The real-time system as claimed in claim 1, wherein the control system is further configured to:
receive a first set of sensed data indicative of a current operating characteristic of the first component; and
receive a second set of data indicative of a current operating characteristic of the second component.

4. The real-time system as claimed in claim 1, wherein the increase of the set point reference of the first component is based on the first set of sensed data and the data set indicative of the level of deterioration of the engine.

5. The real-time system as claimed in claim 1, wherein the decrease of the set point reference of the second component is based on a decrease in thrust from the engine.

6. The real-time system as claimed in claim 1, wherein the controller system is further configured to receive an engine control request, and wherein the change of the set point reference of the first component enables the engine to meet the engine control request.

7. The real-time system as claimed in claim 6, wherein the engine control request is a request for additional thrust.

8. The real-time system as claimed in claim 1, wherein the engine is a gas turbine.

9. The real-time system as claimed in claim 1, wherein the controller system is further configured to:
receive, by way of the system controller, an engine control request;
send, by way of the system controller, a plurality of control demands to the engine, wherein each of the plurality of control demands each respectively controls the first component and the second component;
receive, by way of the system controller, a real-time operating characteristic of each of the first component and the second component;
identify an increased level of degradation of the system; and
based on the identification of the increased level of degradation, modify at least one control demand of the plurality of control demands so that the engine control request is met.

10. The real-time system as claimed in claim 9, wherein the controller system is further configured to change the set point reference of the at least one control demand, wherein a modification of the at least one control demand is based on the trim scheme.

11. The real-time system as claimed in claim 10, wherein modification of the at least one control demand modifies a fuel flow to the engine.

12. The real-time system as claimed in claim 10, wherein the controller system is further configured to identify a difference between the at least one control demand and a sensed output of the first component, wherein the first component corresponds with the at least one control demand, and wherein the modification of the at least one control demand is based on the difference.

13. The real-time system as claimed in claim 1, further comprising an aircraft.

14. The real-time system as claimed in claim 3, wherein the controller system does not increase the set point reference of the first component or decrease the set point reference of the second component if at least one of the first sensed data and the second sensed data correspond to values in the at least one reference schedule.

15. An aircraft, comprising: an engine; and a controller system having a system controller with a processor, the controller system being coupled to an engine and configured to control demand on a first and second component of the engine, the controller system is configured to: operate the engine in a control mode associated with one of the first component and the second component; identify, by way of the system controller, a set point reference of the first component; identify, by way of the system controller, a set point reference of the second component; identify, by way of the system controller, a data set indicative of a level of deterioration of the engine by at least referencing at least one reference schedule that associates a state of at least one of the first component and the second component with a given thrust; and based on the level of deterioration, determine and implement a trim scheme, which includes increasing the set point reference of the first component if the control mode is a rotor speed control mode, and decreasing the set point reference of the control mode is one of an engine pressure ratio control mode and a turbine fan power ratio control mode; and notify a user to change the set point reference of the second component wherein the set point reference of the first component is a fan speed set point reference and the set point reference of the second component is one of an engine pressure ratio set point reference and a turbo fan power ratio set point reference.

* * * * *